(12) United States Patent
Tezuka et al.

(10) Patent No.: US 8,607,604 B2
(45) Date of Patent: Dec. 17, 2013

(54) BOLT AND MANUFACTURING METHOD OF BOLT

(75) Inventors: Norikazu Tezuka, Takasago (JP); Kazuharu Hirokawa, Takasago (JP); Keisuke Ihara, Takasago (JP); Kei Osawa, Takasago (JP); Hiroshi Ishikawa, Takasago (JP); Taiji Torigoe, Takasago (JP); Ryuichi Yamamoto, Takasago (JP); Yukihiro Hashimoto, Takasago (JP); Nobuyuki Izutsu, Takasago (JP); Koji Takahashi, Takasago (JP)

(73) Assignee: Mitsubishi Heavy Industries, Tokyo (JP)

(*) Notice: Subject to any disclaimer, the term of this patent is extended or adjusted under 35 U.S.C. 154(b) by 166 days.

(21) Appl. No.: 13/178,928

(22) Filed: Jul. 8, 2011

(65) Prior Publication Data

US 2011/0268533 A1 Nov. 3, 2011

Related U.S. Application Data

(62) Division of application No. 12/087,603, filed as application No. PCT/JP2007/051148 on Jan. 25, 2007, now abandoned.

(30) Foreign Application Priority Data

Feb. 10, 2006 (JP) .................................. 2006-034168

(51) Int. Cl.
*C21D 7/06* (2006.01)

(52) U.S. Cl.
USPC .............................................. 72/53; 29/90.7

(58) Field of Classification Search
USPC ............................................... 72/53; 29/90.7
See application file for complete search history.

(56) References Cited

U.S. PATENT DOCUMENTS

| 2,263,527 A | 11/1941 | Werme |
| 2,270,662 A | 1/1942 | Raney |

(Continued)

FOREIGN PATENT DOCUMENTS

| CA | 2 555 442 | 8/2005 |
| CN | 1197850 | 11/1998 |

(Continued)

OTHER PUBLICATIONS

Japanese Office Action mailed May 17, 2011 in corresponding Japanese Patent Application No. 2007-557782 w/English translation.

(Continued)

*Primary Examiner* — Teresa M Ekiert
(74) *Attorney, Agent, or Firm* — Wenderoth, Lind & Ponack, L.L.P.

(57) ABSTRACT

A bolt has a male screw with a surface hardening portion that has an increased surface hardness and that is applied with a compressive residual stress. The male screw is formed by cutting the bolt, and performing a process to provide at least on the surface of the male screw of the bolt the surface hardening portion that has increased hardness and that is applied with a compressive residual stress. As a result, the fatigue resistance of the male screw is improved and the bolt is effective for use in a portion where the male screw is subject to a repetitive stress.

3 Claims, 9 Drawing Sheets

(56) References Cited

U.S. PATENT DOCUMENTS

| | | | |
|---|---|---|---|
| 2,335,958 | A | 12/1943 | Parker |
| 3,294,139 | A | 12/1966 | Preziosi |
| 3,345,452 | A | 10/1967 | Logan et al. |
| 3,527,729 | A | 9/1970 | Olson et al. |
| 4,824,314 | A | 4/1989 | Stencel |
| 4,863,330 | A | 9/1989 | Olez et al. |
| 5,417,776 | A | 5/1995 | Yoshino et al. |
| 5,484,244 | A | 1/1996 | Glovan et al. |
| 6,627,335 | B2 * | 9/2003 | Kodama et al. ............. 428/698 |
| 2002/0042302 | A1 * | 4/2002 | Kato ............................ 470/19 |
| 2003/0005736 | A1 * | 1/2003 | Inoue et al. .................... 72/53 |
| 2005/0180840 | A1 * | 8/2005 | Brewer et al. ............... 411/417 |
| 2006/0057414 | A1 * | 3/2006 | Matsuo ........................ 428/586 |
| 2007/0132238 | A1 | 6/2007 | Maeda |
| 2008/0019793 | A1 | 1/2008 | Rosenkranz |

FOREIGN PATENT DOCUMENTS

| | | |
|---|---|---|
| JP | 52-079163 | 7/1977 |
| JP | 61-6209 | 1/1986 |
| JP | 2-218520 | 8/1990 |
| JP | 4-256577 | 9/1992 |
| JP | 6-49509 | 2/1994 |
| JP | 6-229409 | 8/1994 |
| JP | 7-180714 | 7/1995 |
| JP | 2000-317841 | 11/2000 |
| JP | 2002-005084 | 1/2002 |
| JP | 2002-180209 | 6/2002 |
| JP | 2005-187850 | 7/2005 |
| JP | 2005-207268 | 8/2005 |
| JP | 2005-221038 | 8/2005 |
| WO | 2005/075873 | 8/2005 |

OTHER PUBLICATIONS

International Search Report issued Feb. 20, 2007 in International (PCT) Application No. PCT/JP2007/051148.
Chinese Office Action dated Aug. 11, 2010 in corresponding Chinese Patent Application No. 200780004953.3 w/English translation.
Jilai Ru et al., "Research on Shot Peening Strengthening of GH907 High-Temperature Alloy PR747883A", Beijing Institute of Aviation Materials Research, Apr. 30, 1997, pp. 32-36, w/English translation.
Chinese Office Action issued Mar. 29, 2011 in corresponding Chinese Patent Application No. 200780004953.3 w/English translation.
Japanese Decision of a Patent Grant issued Jul. 24, 2012 in corresponding Japanese Patent Application No. 2007-557782 with English translation.
Supplementary European Search Report issued May 30, 2012 in corresponding European Patent Application No. 07707395.5.
European Official Communication under Rule 71(3) EPC issued Apr. 29, 2013 in corresponding European Application No. 07 707 395.5.

* cited by examiner

| BOLT SCREW THREAD CIRCUMFERENTIAL VELOCITY [S] | 80 mm/s |
|---|---|
| BLAST GUN MOVING VELOCITY [V] | 8 mm/s |
| PROJECTION DISTANCE [L] | 500 mm |
| BLAST MATERIAL SUPPLYING PRESSURE [P] | 0.55 MPa |

| MESH SIZE (MEASURE OF BLAST MATERIAL PARTICLE DIAMETER) | IMPROVEMENT OF SURFACE HARDNESS | APPLICATION OF COMPRESSIVE STRESS | SURFACE ROUGHNESS |
|---|---|---|---|
| #46 (355 $\mu$m × 355 $\mu$m) | ○ | ○ | × |
| #80 (180 $\mu$m × 180 $\mu$m) | ○ | ○ | × |
| #100 (150 $\mu$m × 150 $\mu$m) | ○ | ○ | × |
| #150 (100 $\mu$m × 100 $\mu$m) | ○ | ○ | ○ |
| #360 (70 $\mu$m × 70 $\mu$m) | ○ | ○ | ○ |

BOLT AND MANUFACTURING METHOD OF BOLT

This application is a Divisional of U.S. application Ser. No. 12/087,603 filed Jul. 10, 2008, now abandoned, which is a National Stage Application of International Application No. PCT/JP2007/051148, filed Jan. 25, 2007.

TECHNICAL FIELD

The present invention relates to a bolt that is effective to be used in a place where a male screw is subject to a repetitive stress, and relates to a manufacturing method of the bolt.

BACKGROUND ART

Figure 10:
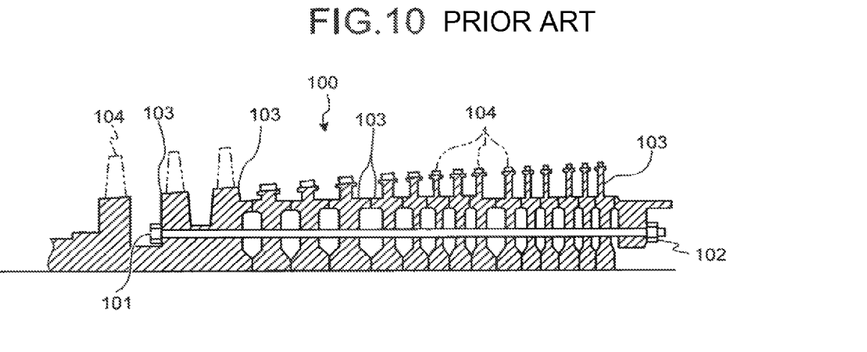
FIG. 10 is a view for explaining a conventional bolt used as a rotor spindle bolt of a gas turbine.
Figure 11:
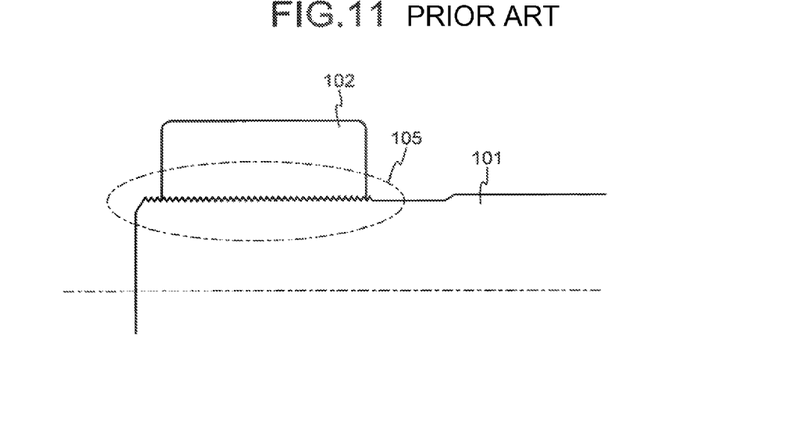
FIG. 11 is a partial enlarged cross-sectional view of an engaging portion of screws.

An example of a bolt used in a place where a male screw is subject to a repetitive stress includes, for example, a rotor spindle bolt of a gas turbine or a stud bolt of an engine crank case. Referring to FIGS. 10 and 11, description will be given below for a rotor spindle bolt of a gas turbine.

In FIG. 10, a reference numeral "100" denotes a rotor of a compressor of a gas turbine. The rotor 100 is configured by: a plurality of discs 103 that are fastened by a rotor spindle bolt (a fastening bolt for the gas turbine), that is, a bolt 101, and a nut 102; and moving blades 104 that are respectively fixed to the plurality of discs 103. The plurality of discs 103 are fastened by the plurality of bolts 101 and the plurality of nuts 102 that are disposed at approximately equal intervals in the circumferential direction of the discs 103.

In the rotor 100, thermal extension difference is generated associated with starting up and stopping of the gas turbine, and an elongation and a shrinkage are caused by projections of fluctuating loads due to thrust, a centrifugal force, or a rotation of the rotor 100 with a deformation under the weight thereof. Therefore, the fastening force of the bolt 101 and the nut 102 is varied. Thus, as shown in FIG. 11, a fluctuating stress (a tensile stress and a bending stress) is applied to an engaging portion of a male screw of the bolt 101 and a female screw of the nut 102, that is, a screw engaging portion 105. When the fluctuating stress is applied to the screw engaging portion 105, the screw engaging portion 105 tends to suffer from wear and fatigue damage. Therefore, improvement is necessary for a fatigue resistance (especially, a fretting fatigue resistance) of the screw engaging portion 105, especially, the male screw of the bolt 101.

Techniques that improve the fatigue resistance of screw fastening members (for example, a bolt and a nut, and a stud bolt) are conventionally presented (for example, Patent Document 1 and Patent Document 2). Description will be given below for a bolt that is a conventional screw fastening member. The bolt that is a conventional screw fastening member is a bolt formed by shaping a male screw that fits with a female screw, into a tapered shape in a direction along which the bolt is pulled (Patent Document 1). Another bolt is a bolt formed by molding a bolt with a round portion beneath the bolt neck thereof that has the curvature radius within a range of 1.2 to 3.0 times as large as that of a round portion beneath the bolt neck of the finished product bolt and by shaping the round portion beneath the bolt neck of the bolt by applying cold working such that the portion has a predetermined curvature radius (Patent Document 2).

However, the former (Patent Document 1) is a technique that equalizes the tensile stress applied on the male screw by shaping the male screw into the tapered shape in a direction along which the bolt is pulled, and is not a technique that increases the surface hardness of the male screw and applies a compressive residual stress to the male screw. Thus, improvement by the former of the fatigue resistance of the male screw is limited. The latter (Patent Document 2) is a technique that increases the surface hardness of the round portion beneath the bolt neck by applying cold working to the round portion beneath the bolt neck and applies a compressive residual stress to the round portion beneath the bolt neck. However, it is not a technique that increases the surface hardness of the male screw and applies a compressive residual stress to the male stress. Therefore, similar to the former, improvement by the latter of the fatigue resistance of the male screw is also limited.

Patent Document 1: Japanese Patent Application Laid-open Publication No. 1981-53651

Patent Document 2: Japanese Patent Application Laid-open Publication No. 07-180714

SUMMARY OF THE INVENTION

Problem to be Solved by the Invention

The problem that the present invention is to solve lies in that improvement of the fatigue resistance of the male screw is limited for a bolt that is a conventional fastening member.

Means for Solving Problem

According to an aspect of the present invention, a bolt having a male screw includes a surface hardening portion that is disposed at least on the surface of the male screw to increase a surface hardness and to provide a compressive residual stress.

Further, in a bolt having a male screw, the surface hardening portion may be formed by a process in which the particles having a equal or smaller particle size of being capable of passing through a mesh with a mesh size of #150 are projected to at least the surface of the male screw.

According to another aspect of the present invention, a manufacturing method of a bolt having a male screw includes the steps of cutting to form the male screw, and processing to provide on at least the surface of the male screw a surface hardening portion that has increased hardness and that is applied with a compressive residual stress.

Further, in a manufacturing method of a bolt having a male screw, the processing step includes a surface treatment by which the particles having a equal or smaller particle size of being capable of passing through a mesh with a mesh size of #150 are projected to at least the surface of the male screw.

Effect of the Invention

The bolt of the present invention has the increased surface hardness of the male screw thereof and has a compressive residual stress applied to the surface of the male screw thereof, due to the surface hardening portion provided at least on the surface of the male screw thereof. Therefore, the bolt of the present invention enables improvement of the fatigue resistance of the male screw thereof and, therefore, the bolt is effective to be used in a portion where the male screw is subject to a repetitive stress.

The bolt of the present invention has the surface hardening portion that is provided by processing of applying particles each having the particle diameter that can pass through the mesh having the mesh size of #150 or a smaller particle diameter, to at least the surface of the male screw. Therefore, the bolt of the present invention has the increased surface hardness of the male screw thereof and has the compressive residual stress applied to the surface of the male screw thereof while no influence is given to the improvement of the fatigue resistance of the male screw due to the roughness of the surface of the male screw. As a result, the bolt of the present invention securely enables the improvement of the fatigue resistance of the male screw.

The manufacturing method of the bolt of the present invention provides, using the step of processing, the surface hardening portion on the surface of the male screw of the bolt formed by the step of cutting. Therefore, due to the surface hardening portion, the surface hardness of the male screw is increased and a compressive residual stress is applied to the surface of the male screw. Therefore, the manufacturing method of a bolt of the present invention enables improvement of the fatigue resistance of the male screw and, therefore, the method enables the manufacture of a bolt that is effective to be used in a portion that generates a repetitive stress to the male screw thereof.

According to the manufacturing method of the bolt of the present invention, the surface hardening portion is formed on the surface of the male screw of the bolt by processing of applying the particles each having the particle diameter that can pass through the mesh having the mesh size of #150 or a smaller particle diameter, to at least the surface of the male screw. Therefore, the manufacturing method of a bolt of the present invention enables increase of the surface hardness of the male screw and application of the compressive residual stress to the surface of the male screw while no influence is given to the improvement of the fatigue resistance of the male screw due to the roughness of the surface of the male screw. As a result, the manufacturing method of a bolt of the present invention enables manufacture of a bolt of which the fatigue resistance of the male screw can securely be improved.

EXPLANATIONS OF LETTERS OR NUMERALS 1 bolt
10 male screw
11 surface hardening portion
12 surface of male screw
13 blast gun
2 nut
20 female screw
21 surface soft coating portion
22 surface of female screw
3 fatigue resistance validation testing apparatus
30 base
31 lateral hole
32 longitudinal hole
33 pushing bar
34 stress measuring device
35 portion to be tested
d effective diameter of male screw
D effective diameter of finished product male screw
D0 effective diameter of female screw of base material
T thickness of surface soft coating portion
T1 the maximum of the surface roughness of male screw
T2 the maximum of the surface roughness of female screw
S bolt screw thread circumferential velocity
V blast gun moving velocity
L projection distance
P blast material supplying pressure
100 rotor
101 bolt
102 nut
103 disc
104 moving blade
105 screw engaging portion

DETAILED DESCRIPTION OF THE INVENTION

Figure 1A:
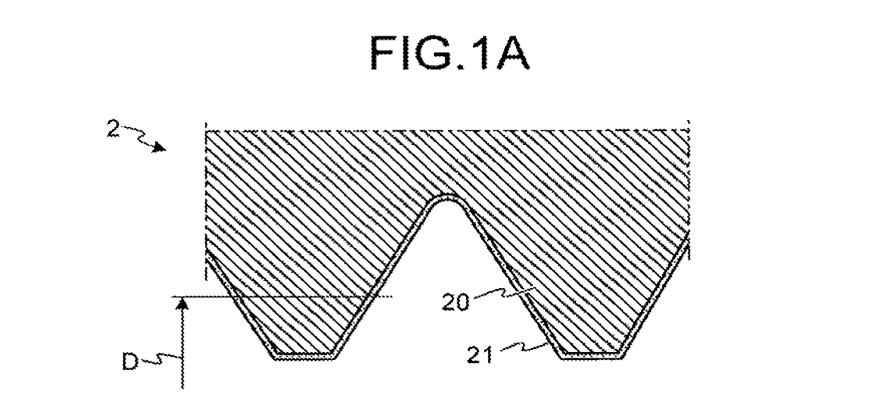
FIGS. 1A and 1B are partial enlarged cross-sectional views of an embodiment of a bolt according to the present invention.

Referring to FIGS. 1A to 7, description will be given in detail for one of embodiments of a bolt according to the present invention and one of embodiments of a manufacturing method of a bolt according to the present invention. These embodiments do not limit the present invention. FIG. 1A is a partial enlarged cross-sectional view of the structure of a female screw of a nut and FIG. 1B is a partial enlarged cross-sectional view of the structure of a male screw of a bolt according to the embodiment. FIG. 2A is a view for explaining an embodiment of a processing step of a surface hardening portion of the manufacturing method of a bolt according to the embodiment and FIG. 2B is a chart for explaining a condition for the processing of the surface hardening portion.

Embodiments

Figure 1B:
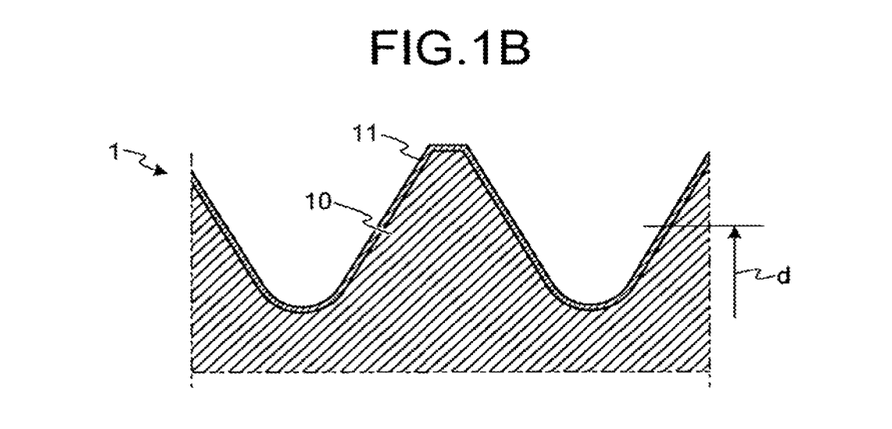

Description will be first given for a bolt according to the present invention. In FIG. 1B, a reference numeral "1" denotes a bolt according to the embodiment. The bolt 1 is configured by, for example, a nickel-based super alloy. The bolt 1 can be a bolt that is configured by, for example, iron, low alloy steel, stainless steel, or another super alloy, in addition to the nickel-based super alloy. The bolt 1 includes a head portion, a shaft portion, and a screw portion each formed by cutting processing. On the outer face of the screw portion, a male screw 10 having an effective diameter d is formed by cutting processing. At least on the surface of the male screw 10 of the bolt 1, a surface hardening portion 11 having increased surface hardness and applied with a compressive residual stress is provided.

The surface hardening portion 11 is formed by a processing step such as, for example, a shot blast or a shot peening. In the process, particles each having a particle diameter equal to or less than the diameter that can pass through a mesh having a mesh size of #150, which has a mesh of 100 μm×100 μm, to at least the surface of the male screw 10 of the bolt 1.

Figure 2A:
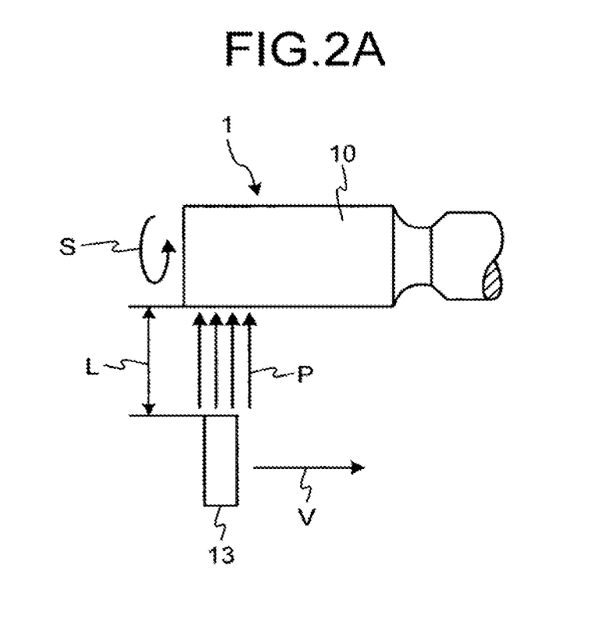
FIGS. 2A and 2B are a view and a chart for explaining an embodiment of a manufacturing method of a bolt according to the present invention.
Figure 2B:
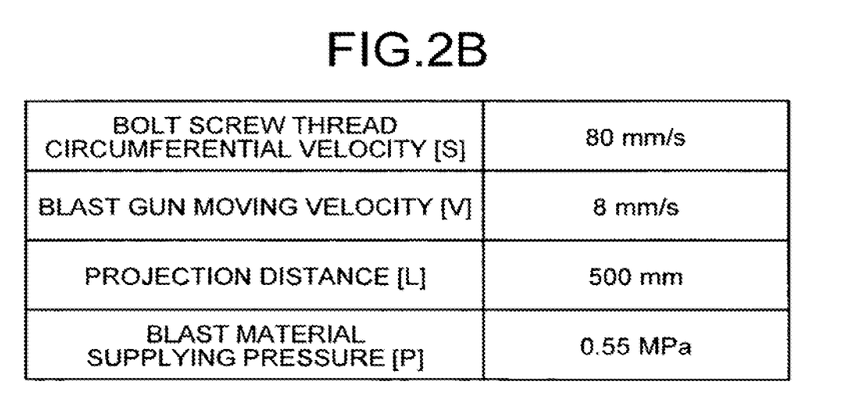

Referring to FIGS. 2A and 2B, description will be given for an embodiment of a manufacturing method of a bolt according to the present invention. In the cutting step, the head portion, the shaft portion, and the screw portion of the bolt 1 are configured and the male screw 10 having the effective diameter d is formed on the outer face of the screw portion. In the processing step, the surface hardening portion 11 having increased surface hardness and applied with a compressive residual stress is provided.

The processing step is executed by, for example, a shot blast or shot peening, of applying particles each having a particle diameter that can pass through a mesh having the mesh size of #150, that is, a mesh of 100 μm×100 μm or a smaller particle diameter, to at least the surface of the male screw 10 of the bolt 1.

At the processing step, the surface hardening portion 11 is processed under the condition shown in FIGS. 2A and 2B. That is: a bolt screw thread circumferential velocity (S) at which the male screw 10 of the bolt 1 is rotated around the shaft center thereof is 80 mm/s; a blast gun moving velocity (V) at which a blast gun 13 is moved in parallel to the shaft center of the bolt 1 is 8 mm/s; an projections distance (L) that is the distance from the blast gun 13 to the male screw 10 of the bolt 1 is 500 mm; a blast material supplying pressure (P) that is the force to apply a blast material from the blast gun 13 to the male screw 10 of the bolt 1 is 0.55 MPa; and the particle diameter of the blast material to be applied from the blast gun 13 to the male screw 10 of the bolt 1 is a particle diameter that can pass through a mesh having the mesh size of #150 (a mesh is 100 μm×100 μm) or a smaller particle diameter.

Each of the bolt 1 according to the embodiment and the bolt 1 manufactured according to the manufacturing method of a bolt according the embodiment can be used, for example, as the rotor spindle bolt of the gas turbine shown in FIG. 10 or a stud bolt of an engine crank case. That is, each of the bolt 1 according to the embodiment and the bolt 1 manufactured according to the manufacturing method of a bolt according the embodiment is effective as a bolt to be used in a portion where the male screw 10 is subject to a repetitive stress.

Figure 3:
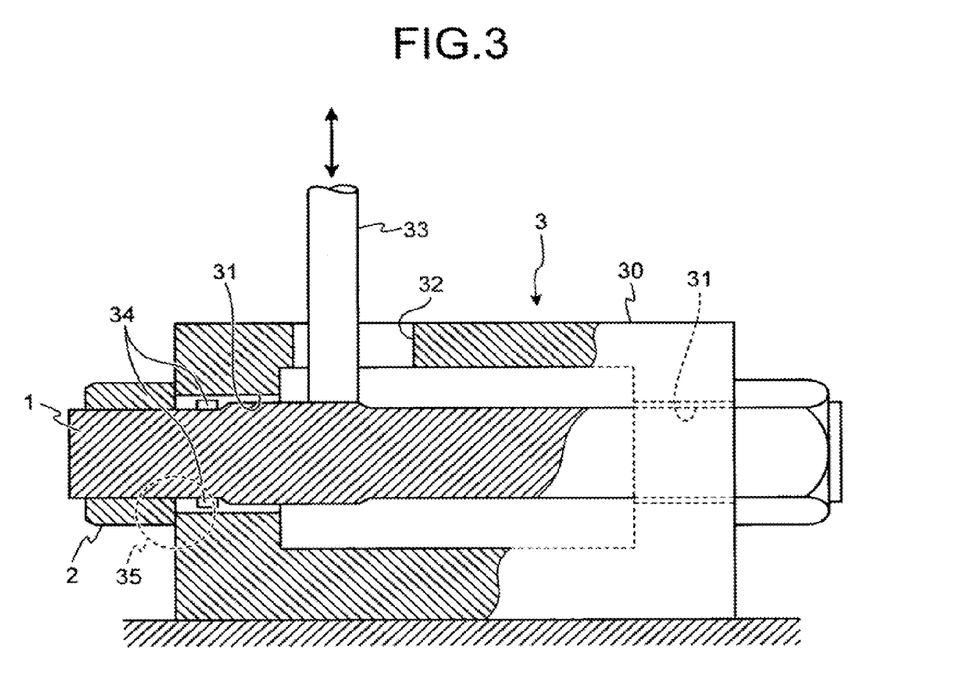
FIG. 3 is a view for explaining a fatigue resistance validating test using a fatigue resistance validation testing apparatus.

Description will be given for the effectiveness of each of the bolt 1 according to the embodiment and the bolt 1 manufactured according to the manufacturing method of a bolt according the embodiment based on a fatigue resistance validating test using a fatigue resistance validation testing apparatus 3 shown in FIG. 3.

The bolt 1 to be tested is inserted into a lateral hole 31 of a base 30 of the fatigue resistance validation testing apparatus 3. The bolt 1 is fixed on the base 30 under a predetermined tensile load by fastening a nut 2 or nuts 2 at an end or respectively ends of the bolt 1. A pushing bar 33 is inserted into a longitudinal hole 32 of the base 30 and the pushing bar 33 is pressed onto the bolt 1. A stress measuring device 34 is provided on the bolt 1 in the vicinity of a portion 35 to be tested. The stress measuring device 34 is a measuring device to judge whether any crack has been generated in the portion 35 to be tested and, when the value being measured suddenly varies, this shows that a crack is generated in the portion 35 to be tested. In a test environment of the room temperature atmosphere, a fatigue test on the portion 35 to be tested (the thread face and the screw bottom of the bolt 1) of the bolt 1 is executed by applying a predetermined repetitive bending load to the bolt 1 by the pushing bar 33. The predetermined tensile load is a load that is ⅔ of the load that plastic-deforms the bolt 1. The predetermined repetitive bending load is a load that is about 2 to 2.5% of the load that plastic-deforms the bolt 1.

Figure 4:
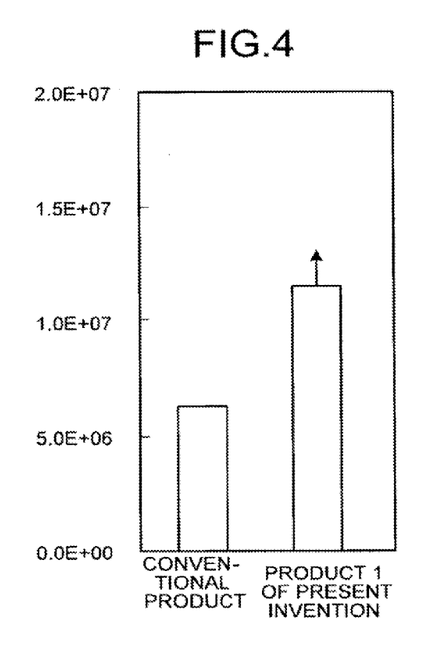
FIG. 4 is a chart for explaining the result of the fatigue resistance validating test using the fatigue resistance validation testing apparatus for a conventional product and a product 1 of the present invention.

The result of the fatigue resistance validating test using the fatigue resistance validation testing apparatus 3 is shown in FIG. 4. The axis of ordinate of FIG. 4 represents the number of times of the application of the predetermined repetitive bending load applied to the bolt by the pushing bar 33. As shown in FIG. 4, a conventional product (a conventional bolt) has a crack generated in the portion to be tested when the number of times of the application of the predetermined repetitive bending load is about $6.3 \times 10^6$. In contrast, the product 1 of the present invention (each of the bolt 1 according to the embodiment and the bolt 1 manufactured according to the manufacturing method of a bolt according to the embodiment) has no crack generated in the portion 35 to be tested even when the number of times of the application of the predetermined repetitive bending load exceeds about $1.2 \times 10^7$. That is, the product 1 of the present invention has obtained the fatigue resistance thereof that is about two times as high as that of the conventional product. Incidentally, as the result of a fretting fatigue test using a test piece, that is, a test executed by sandwiching a moving test piece by contactors such that an even surface pressure is applied to the moving test piece, and applying a local stress amplitude to the moving test piece, fatigue resistance that is more than about 10 times as high as that of a test piece of the conventional product could be obtained with a test piece of the product 1 of the present invention.

As is clear from the above, each of the bolt 1 according to the embodiment and the bolt 1 manufactured according to the manufacturing method of a bolt according to the embodiment can obtain fatigue resistance that is more than two times as high as that of a conventional bolt and, therefore, is effective as a bolt to be used in a portion where the male screw 10 is subject to a repetitive stress such as the rotor spindle bolt of the gas turbine as shown in FIG. 10 or a stud bolt of an engine crank case.

For the bolt 1 according to the embodiment and in the manufacturing method of a bolt according to the embodiment, the surface hardening portion 11 having increased surface hardness and applied with a compressive residual stress is provided at least on the surface of the male screw 10 by the process of applying particles (the blast material) to at least the surface of the male screw 10. When the surface hardening portion 11 is provided by the processing, the most important factor is the particle diameter of the particles (the blast material) to be applied to at least the surface of the male screw 10.

That is, for the bolt 1 according to the embodiment and the manufacturing method of a bolt according to the embodiment, objects are "to improve the hardness of" and "to apply a compressive residual stress to" at least the surface of the male screw 10 to improve the fatigue resistance thereof. However, depending on the particle diameter of the particles to be applied to at least the surface of the male screw 10, the "roughness" of at least the surface of the male screw 10 is varied and, thereby, the fatigue resistance of the screw bottom is significantly influenced.

Figure 5:
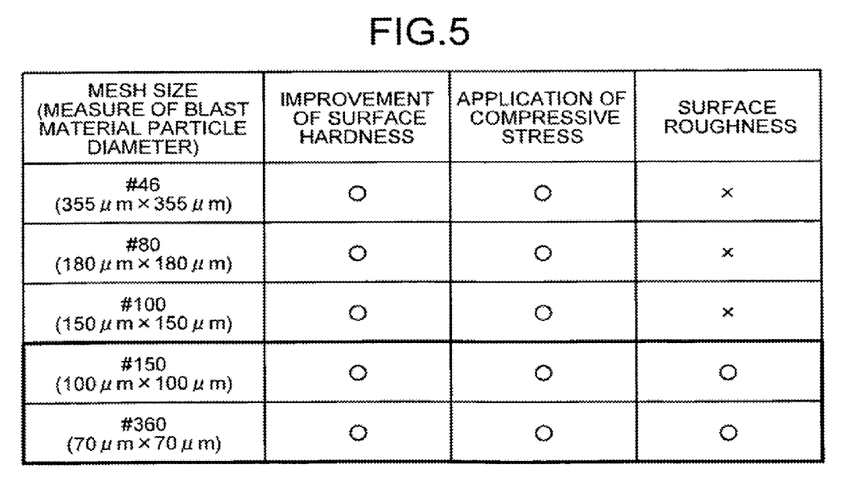
FIG. 5 is a chart for explaining the influence on the fatigue resistance depending on particle sizes.

Referring to FIG. 5, description will be given for the influence on the fatigue resistance due to the magnitude of the particle diameter. As shown in FIG. 5, the "improvement of the hardness of" and "application of a compressive residual stress to" at least the surface of the male screw 10 are not influenced by the magnitude of the particle diameter. On the other hand, the "roughness" of at least the surface of the male screw 10 is influenced by the magnitude of the particle diameter. That is, when the particle diameter is for the mesh size #46 (a mesh is 355 μm×355μm, that is, a measure of the blast material particle diameter), the mesh size #80 (a mesh is 180 μm×180 μm, that is, a measure of the blast material particle diameter), and the mesh size #100 (a mesh is 150 μm×150 μm, that is, a measure of the blast material particle diameter), the "surface roughness" of at least the surface of the male screw 10 is high and the fatigue resistance of the screw bottom is almost same as that of the conventional product shown in FIG. 4. On the other hand, when the particle diameter is for the mesh size #150 (a mesh is 100 μm×100 μm, that is a measure of the blast material particle diameter), and the mesh size #360 (a mesh is 70 μm×70 μm, that is a measure of the blast material particle diameter), the "surface roughness" of at least the surface of the male screw 10 is low and the fatigue resistance of the screw bottom almost same as that of the product 1 of the present invention shown in FIG. 4 can be obtained.

As above, for the bolt 1 according to the embodiment and in the manufacturing method of a bolt according to the embodiment, at least the male screw 10 is applied with the blast material having the particle diameter that can pass through a mesh of the mesh size #150 (a mesh is 100 μm×100 μm) or a smaller particle diameter, preferably, the mesh size #150 (a mesh is 100 μm×100 μm, that is, a measure of the blast material particle diameter), and the mesh size #360 (a mesh is 70 μm×70 μm, that is, a measure of the blast material particle diameter).

Figure 6:
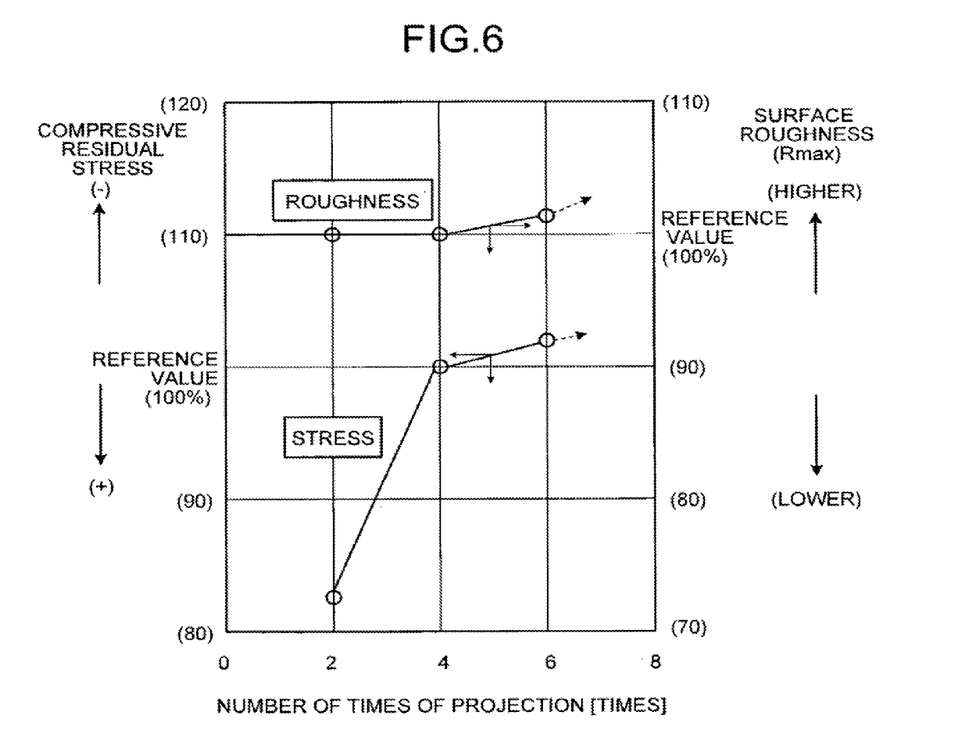
FIG. 6 is a chart for explaining the influence on the fatigue resistance depending on the number of projections.
Figure 7:
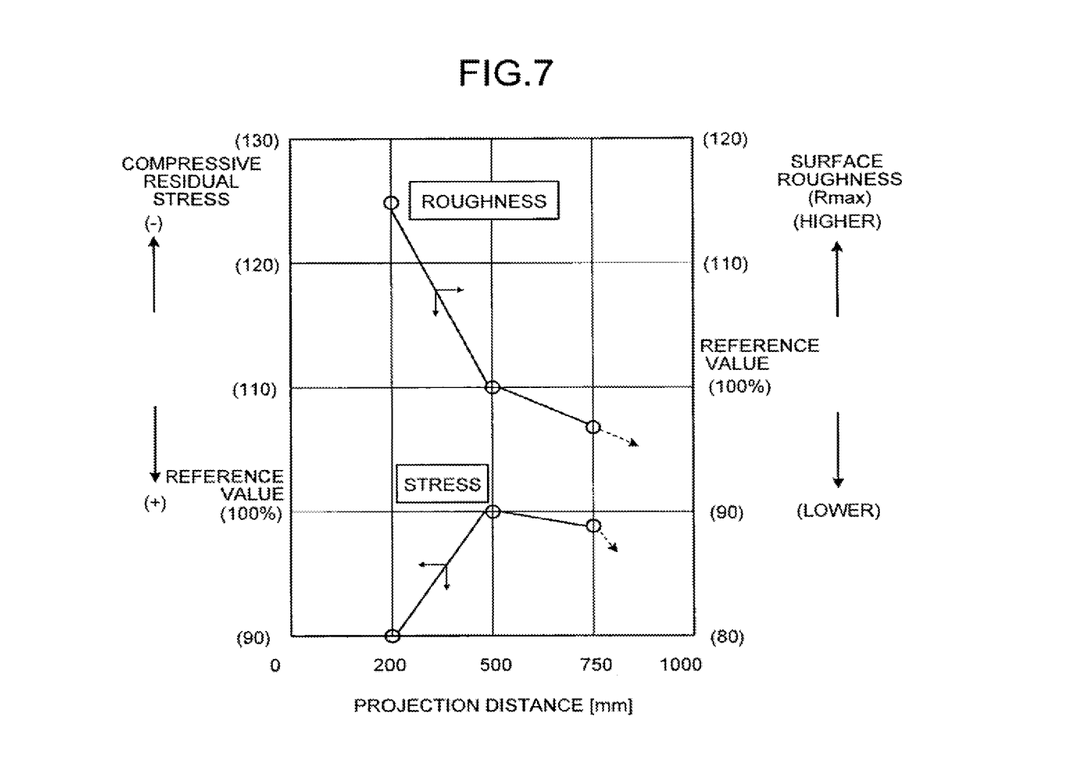
FIG. 7 is a chart for explaining the influence on the fatigue resistance depending on projection distances.

Conditions for the processing using the blast material include the number of times of the projections of the blast material and the projection distance (L) from the blast gun to the male screw as the next important factors following the particle diameter of the blast material. Referring to FIGS. 6 and 7, description will be given below for the influence on the fatigue resistance due to the number of times of the projections of the blast material to the male screw 10 of the bolt 1 and the projection distance (L) from the blast gun to the male screw.

FIG. 6 is a chart of the relation between the number of times of the projections of the blast material, and the residual stress and the surface roughness. The axis of abscissa represents the number of times of the projections. The axis of ordinate on the left represents the compressive residual stress. The axis of ordinate on the right represents the surface roughness (Rmax) of the surface of the male screw. The compressive residual stress is represented as becoming larger in the upward direction on the axis of ordinate and smaller in the downward direction on the axis of ordinate.

In FIG. 6, the result obtained when the processing is executed with varied number of times of the projections under the conditions shown in FIG. 2B and using the blast material having the particle diameter for the mesh size #150. Under these conditions, the fatigue resistance same as that of the product 1 of the present invention shown in FIG. 4 is obtained with a bolt obtained under the condition of four times of the projections. The compressive residual stress and the surface roughness in this case are selected as the reference values. The scale on the axis of ordinate is shown in percentage taking the reference values as 100%.

Description will be given for the meaning of the number of times of the projections of the blast material. According to a processing method shown in FIG. 2A, the blast material is applied to the outer surface of the male screw 10 of the bolt 1 with the bolt being rotated while the blast gun is simultaneously moved along the shaft direction. The gun turns into the reverse direction when the gun reaches the end of the male screw and is moved in the reverse direction continuously applying the blast material. The gun repeats this repetitive movement and, thereby, the processing of the surface of the male screw is executed. The number of times of the projections represents the number of times (the frequency) the blast material is applied to one same surface.

FIG. 7 shows the relation between the projection distance from the blast gun to the male screw, and the residual stress and the surface roughness. The axis of abscissa represents the projection distance. The axes of ordinates are same as those of FIG. 6. FIG. 7 shows the result of the processing with, as the processing conditions, the number of times of the projections being fixed at four times, other conditions being selected similarly to those in FIG. 6, and varied projection distances. The policy on the reference values and the axes of ordinates is same as that of FIG. 6.

According to FIG. 6, the compressive residual stress is significantly insufficient for the reference value when the number of times of projections is two times, and reaches the reference value when the number of times of the projections is four. When the number of times of the projections is six, some increase of the compressive residual stress can be recognized. On the other hand, the surface roughness has no significant change in the magnitude thereof when the number of times of the projections is two to four. However, the surface roughness is somewhat increased when the number of times of the projections is six. When the number of times of the projections exceeds six, the surface roughness is drastically increased.

According to FIG. 7, the compressive residual stress is insufficient for the reference value and the surface roughness significantly exceeds the reference value when the projection distance is 200 mm. When the projection distance is 500 mm, the compressive residual stress and the surface roughness both respectively satisfy the reference values thereof. When the projection distance is 750 mm, the compressive residual stress and the surface roughness both respectively are somewhat lower than the reference values thereof. However, in the region that exceeds the projection distance of 750 mm, the compressive residual stress is remarkably lowered.

According to FIGS. 6 and 7, when the number of times of the projections is four to six, the compressive residual stress exceeds the reference value thereof while the variation of the surface roughness is relatively small and almost no influence associated with the increase of the surface roughness on the fatigue resistance is present. When the projection distance is 500 to 750 mm, the compressive residual stress almost reaches the reference value thereof and, even when the projection distance is increased, decrease of the compressive residual stress is relatively small. That is, though the compressive residual stress is increased when the number of times of the projections is increased, decrease of the fatigue resistance is caused because the surface roughness becomes too large when the number of times of the projections exceeds six. On the other hand, though the compressive residual stress becomes larger when the projection distance is smaller, the fatigue resistance, on the contrary, becomes lower because the surface roughness simultaneously becomes larger. When the projection distance exceeds 750 mm, the effect of the blast processing becomes weak and the fatigue resistance is not increased. Therefore, it is preferable to select the number of times of the projections of four to six times and the projection distance of 500 to 750 mm as the processing conditions. Under these conditions, the hardness equal to or larger than that of the base material of the bolt can be secured as the surface hardness of the surface hardening portion.

For the bolt 1 according to the embodiment and in the manufacturing method of a bolt according to the embodiment, a rustproof nonferrous material such as alumina ($Al_2O_3$), silicon carbide (SiC), or silica ($SiO_2$) is used as the material of the particles to be applied to at least the surface of the male screw 10.

Figure 8A:
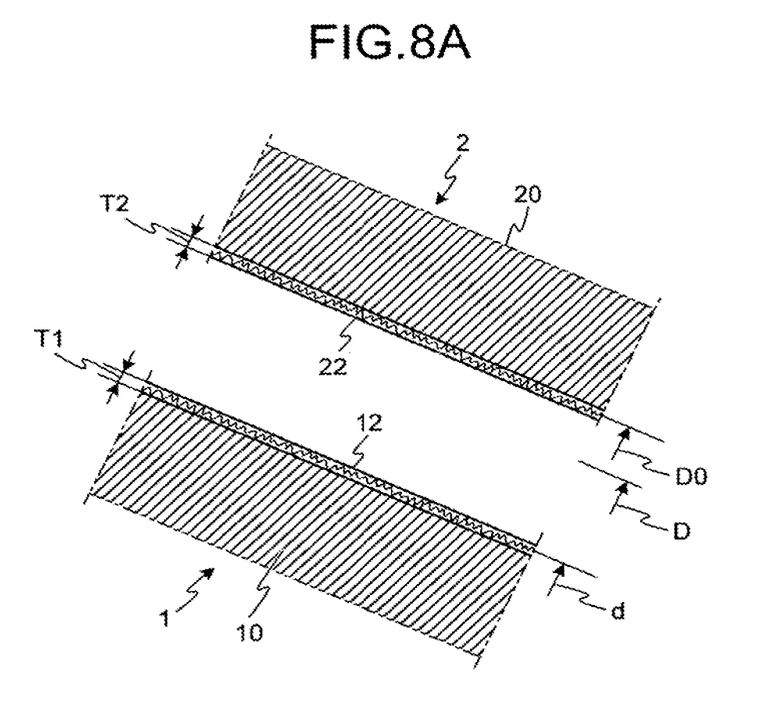
FIGS. 8A and 8B are views for explaining an embodiment of a manufacturing method of a nut.
Figure 8B:
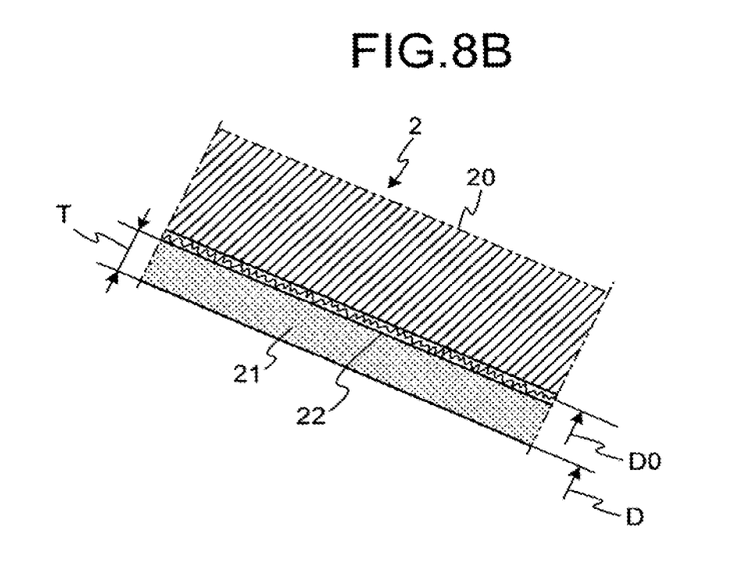

Referring to FIGS. 1A, 8A and B, and 9, description will be given for the nut that configures the screw fastening member together with the bolt according to the present invention, and a manufacturing method of the nut. FIG. 8A is a partial enlarged cross-sectional view of the surface roughness of the male screw of the bolt and the surface roughness of the female screw of the nut. FIG. 8B is a partial enlarged cross-sectional view of the structure of the female screw of the nut.

In FIG. 1A, the reference numerals "2" denote the nut. The nut 2 is configured by, for example, steel. For the nut 2, a threaded hole is configured by cutting. Inside the threaded hole, a female screw 20 is formed by cutting. A surface soft coating portion 21 having hardness that is lower than that of the base material of the nut 2 is provided on the surface of the female 20 of the nut 2.

The surface soft coating portion 21 is provided by, for example, Cu—Ni—In flame spray coating, cermetal W coating, silver plating, copper plating, etc. As shown in FIGS. 8A and 8B, the thickness (film thickness) T of the surface soft coating portion 21 is set to be larger than the sum of the maximum T1 of the roughness of the surface 12 of the male screw 10 of the bolt 1 and the maximum T2 of the roughness of the surface 22 of the female screw 20 of the nut 2. As a result, when the female screw 10 of the bolt 1 is screwed into the female screw 20 of the nut 2, the surface 12 of the male screw 10 of the bolt 1 and the surface 22 of the female screw 20 of the nut 2 are not exposed out of the surface soft coating portion 21 and do not contact with each other.

Depending on the thickness T of the surface soft coating portion 21, the effective diameter of the female screw 20 of the nut 2 needs to be varied. That is, for the nut 2, the effective diameter D0 of the female screw 20 (that is, the effective diameter D0 of the female screw of the base material) employed when the surface soft coating portion 21 is provided needs to be set to be larger by the dimension almost same as that of the thickness T of the surface soft coating portion 21 than the effective diameter D of the female screw 20 (that is, the effective diameter D of a finished product female screw) employed when the surface soft coating portion 21 is not provided.

On the other hand, when the thickness T of the surface soft coating portion 21 is set to be too large, the effective diameter D0 of the female screw of the base material becomes too large against the effective diameter D of the finished product female screw. Thereby, the screw ridge in the original size becomes too small and, therefore, the strength may be insufficient. Thus, the thickness T of the surface soft coating portion 21 has the maximum thereof around the dimension (X) with which the thread ridge in the original size is not too small and, thereby, the strength is not insufficient. As a result, the thickness T of the surface soft coating portion 21 is in the following range. That is, the range is T1+T2<T<(X). The thickness T of the surface soft coating portion 21 differs depending on the tolerance of the screw and, for example, the thickness T is about 25 μm for the Class-II screw tolerance (for the Class-II fitting).

Referring to FIGS. 8A and 8B, description will be given for an example of a manufacturing method of the nut 2 shown in FIG. 1A. In the cutting step, a screw hole of the nut 2 is configured and the female screw 20 is formed on the inner face of the screw hole. The effective diameter D0 of the female screw 20 is larger by the thickness T of the surface soft coating portion 21 than the effective diameter D of the finished product female screw. In the processing step, the surface soft coating portion 21 having hardness that is lower than that of the base material of the nut 2 is provided on the surface of the female screw 20 of the nut 2 by, for example, Cu—Ni—In flame spray coating, cermetal W coating, silver plating, copper plating, etc.

Almost similarly to the bolt 1 according to the embodiment and the bolt 1 manufactured according to the manufacturing method of a bolt according to the embodiment, the nut 2 shown in FIG. 1A and the nut 2 manufactured according to the manufacturing method of a nut shown in FIGS. 8A and 8B can be used as a nut to be screwed into the rotor spindle bolt of the gas turbine shown in FIG. 10 or a stud bolt of an engine crank case. That is, almost similarly to the bolt 1 according to the embodiment and the bolt 1 manufactured according to the manufacturing method of a bolt according to the embodiment, the nut 2 shown in FIG. 1A and the nut 2 manufactured according to the manufacturing method of a nut shown in FIGS. 8A and 8B are effective as nuts to be used in a portion where the engaging portion of the male screw 10 of the bolt 1 and the female screw 20 of the nut 2 is subject to a repetitive stress.

Description will be given below for the effectiveness of the nut 2 shown in FIG. 1A and the nut 2 manufactured according to the manufacturing method of a nut shown in FIGS. 8A and 8B referring to an explanatory view showing the result of executing a fretting fatigue test using a test piece shown in FIG. 9, that is, a test executed by sandwiching a moving test piece by contactors such that an even surface pressure is applied to the moving test piece, and applying a local stress amplitude to the test piece.

Figure 9:
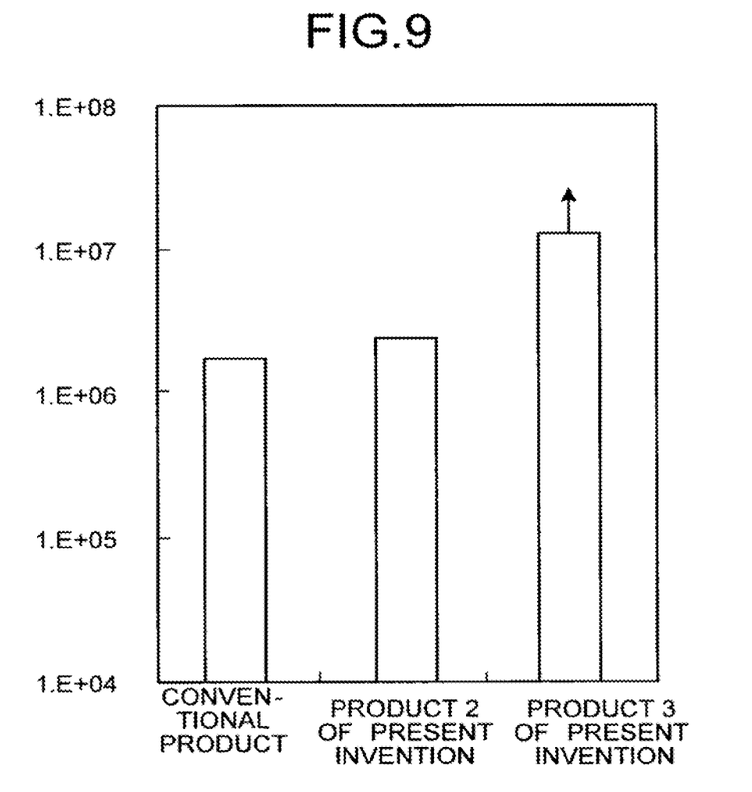
FIG. 9 is a chart for explaining the result of a fretting fatigue test using test pieces of nuts.

The axis of ordinate of FIG. 9 represents the number of times of repetition of fatigue. As shown in FIG. 9, when the number of times of fatigue repetition has reached about $1 \times 10^6$, a break occurs to a conventional product (a conventional nut). In contrast, when the number of times of fatigue repetition has reached about $1.4 \times 10^6$, a break occurs to the products 2 of the present invention (the nut 2 shown in FIG. 1A and the nut 2 manufactured according to the manufacturing method of a nut shown in FIGS. 8A and 8B that each have a surface soft coating portion 21 formed by plating). Even when the number of times of fatigue repetition has exceeded about $1.1 \times 10^7$, no break occurs to products 3 of the present invention (the nut 2 shown in FIG. 1A and the nut 2 manufactured according to the manufacturing method of a nut shown in FIGS. 8A and 8B that each have a surface soft coating portion 21 formed by Cu—Ni—In flame spray coating). That is, sufficient fatigue resistance can be obtained with the nuts 2, 3 of the present invention compared to the conventional nut.

As above, by using the bolt 1 according to the embodiment and the bolt 1 manufactured according to the manufacturing method of a bolt according to the embodiment, the bolt 1 is effective as a bolt used in a portion where the male screw 10 of the bolt 1 is subject to a repetitive stress such as the rotor spindle bolt of the gas turbine shown in FIG. 10. By using the bolt 1 according to the embodiment and the bolt 1 manufactured according to the manufacturing method of a bolt according to the embodiment and the nut 2 shown in FIG. 1A and the nut 2 manufactured according to the manufacturing method of a nut shown in FIGS. 8A and 8B, the bolt 1 and the nut 2 are further effective as a bolt and a nut used in a portion where the engaging portion of the male screw 10 of the bolt 1 and the female screw 20 of the nut 2 is subject to a repetitive stress such as the rotor spindle bolt and the nut of the gas turbine shown in FIG. 10.

Industrial Applicability

A bolt according to the present invention and a manufacturing method of a bolt according to the present invention are useful as a bolt and a manufacturing method of the bolt to be used in a portion where a male screw thereof is subject to a repetitive stress.

The invention claimed is:

1. A manufacturing method of a bolt having a male screw, comprising:
   cutting the bolt to form the male screw, the male screw being made of a nickel-based super alloy; and
   processing to provide on at least the surface of the male screw a surface hardening portion that has increased hardness and that is applied with a compressive residual stress, wherein
   said processing includes a surface treatment by which aluminum particles having an equal or smaller particle size that are capable of passing through a mesh with a mesh size of #150 are projected to at least the surface of the male screw.

2. The manufacturing method of claim 1, wherein
   said processing includes the aluminum particles being projected to the surface of the male screw four to six times.

3. The manufacturing method of claim 1, wherein
   in said processing, the aluminum particles are projected to the surface of the male screw from a projection distance ranging between 500 mm and 750 mm.

* * * * *